W. H. Hall.
Heel Guard for Horses.

No. 91,122.  Patented Jan. 8, 1869.

Witnesses.  Inventor.
Wm. W. Post  Wm. H. Hall
W. H. Vennilyea  by Frank Fuller
  Atty.

United States Patent Office.

WILLIAM H. HALL, OF NEW GLOUCESTER, MAINE, ASSIGNOR TO HIMSELF AND JOHN R. CLIFFORD, OF CHELSEA, MASSACHUSETTS.

Letters Patent No. 91,122, dated June 8, 1869.

IMPROVED ELASTIC HEEL-GUARD FOR HORSES.

The Schedule referred to in these Letters Patent and making part of the same.

To all whom it may concern:

Be it known that I, WILLIAM H. HALL, of New Gloucester, Cumberland county, and State of Maine, have invented a new and improved Elastic Heel-Guard for Horses; and I do hereby declare the following to be a full and exact description thereof, reference being had to the accompanying drawings, and to the letters of reference marked thereon.

My invention consists in constructing, of India rubber, or other elastic material, a protector or guard for the upper part of the front hoof of a horse, as well as for that portion of the parts contiguous thereto which are most liable to injury by being bruised, wounded, or cut by blows from the rear hoof, or the shoe attached thereto, while the horse is moving at a rapid rate of speed, while, at the same time, the interior of the guard is so accurately conformed to the anatomy of the parts which it is designed to cover, that a change of position, by slipping or turning, is not likely to occur. The inside of said guard being lined with kersey, collects the moisture from the ankle, and prevents the chafing of the leg.

To enable others skilled in the art to make and use my invention, I will proceed to describe its construction and operation.

Similar letters refer to similar parts.

A is a strip of India rubber, or other elastic material, so moulded or formed as to fit accurately the rear part of the forward hoof of the horse, and the parts immediately above and contiguous thereto. It is of such length that it may be carried around just above the front part of the hoof, and there secured by a strap and buckle, as shown at c.

B and C are interior projections, fitting the anatomy of the parts.

D D are also interior projections, designed to fit into and around the space between the shoe and the hoof on either side, at the rear portion thereof, which arrangement secures the guard more firmly in its position.

E E are smaller interior projections, or heads, which seize upon the upper portion of the hoof at the rear, and also assist in holding the guard in place.

Figure 1:
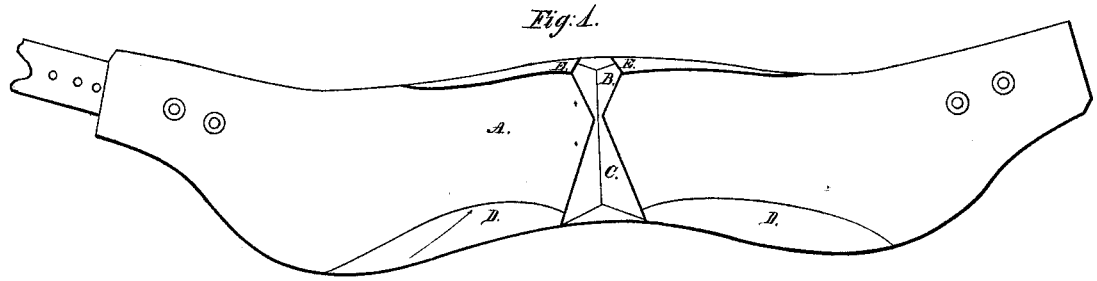
Figure 1 is a view of the interior of the guard when extended.
Figure 2:
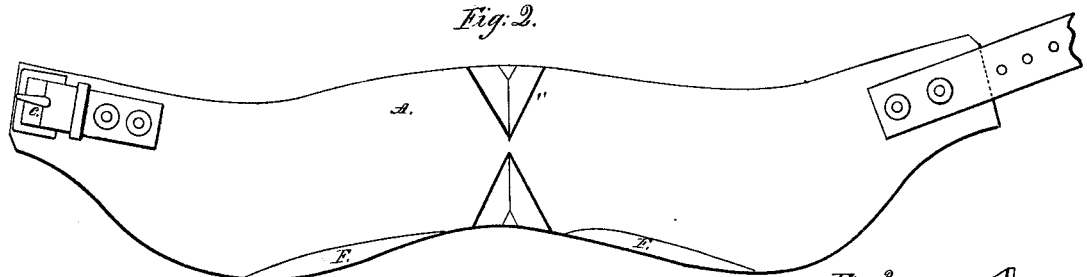
Figure 2 is a view of the exterior of the same.
Figure 4:
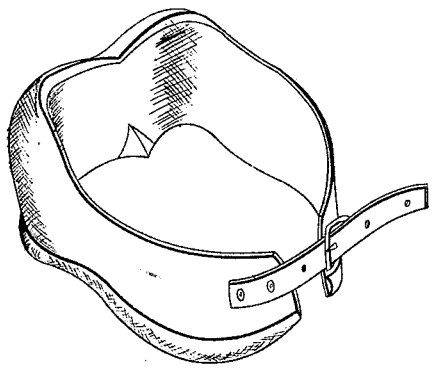
Figure 4 represents a perspective view, showing the interior lining of the guard.

Fig. 2 shows exterior projections at F F. These are designed to receive the blows from the hinder feet, and to break their force, the increased thickness at these points, where the delicate muscular structure is most liable to injury, giving increased elasticity, and more effectually cushioning and deadening the blows, and preventing the cuts caused by overreaching, which prove so especially injurious to horses kept for racing-purposes.

Figure 3:
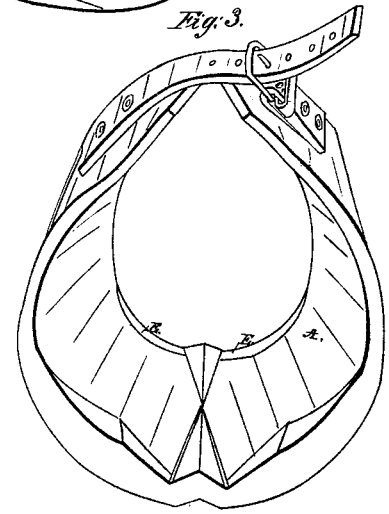
Figure 3 is a perspective view of the closed guard.

Fig. 3 shows the guard bent and buckled, precisely as when in use. It flares toward the bottom, to conform to the shape of the hoof, and narrows toward the top, to conform to the shape of the ankle.

When in place, the rear of the hoof and frog, as well as the parts just above them, is fully covered, cushioned, and protected, while the strip is so shaped as to protect the upper portion of the hoof, and the parts immediately contiguous thereto, not only at the rear portion, but along the side and in front.

The exterior rubber-surface and the interior lining of kersey are all made at the one operation.

The guard, when thus applied to the front feet of the horse, protects them from such injuries as may be caused by the hind feet.

The front shoes are not liable to be torn off by the hind shoes, as the guard tends to protect them.

For horses having "quarter-cracks," the guard is found to be especially useful, as it can be drawn together, and thus tends to bring the edges of the crack in apposition.

Sand and all foreign substances are thus excluded, and recovery facilitated.

I am able to secure the same results by constructing my guard of a single piece of elastic India rubber, in the form of the frustum of a cone, with its appropriate interior and exterior projections, thus dispensing with the use of straps and buckles, by simply drawing the guard over the hoof to its position, which position its elasticity enables it to retain.

I do not claim covering the parts of the front lower extremities of a horse most liable to injury, so as to protect the same against cuts or blows caused by "interfering" or "overreaching," as cloth, leather, rope, and the like, have been rudely applied to the ankles of horses for this purpose; but

What I claim, is—

As an article of manufacture, a heel-guard of India rubber, formed as described, that is to say, with the interior projections and rolls lined with kersey, all as herein shown and described.

WM. H. HALL.

Witnesses:
FRANK FULLER,
WM. W. POST.